UNITED STATES PATENT OFFICE.

JAMES THOMAS SIMPSON, OF IOLA, TEXAS.

INSECTICIDE.

SPECIFICATION forming part of Letters Patent No. 388,315, dated August 21, 1888.

Application filed November 7, 1887. Serial No. 254,510. (No specimens.)

*To all whom it may concern:*

Be it known that I, JAMES THOMAS SIMPSON, a citizen of the United States, and a resident of Iola, in the county of Grimes and State of Texas, have invented certain new and useful Improvements in Insecticide Compositions; and I do hereby declare that the following is a full, clear, and exact description of the invention, which will enable others skilled in the art to which it appertains to make and use the same.

My invention consists in a compound or composition for the extermination of ants, moles, salamanders, prairie-dogs, large rats, &c., and the nature and ingredients of my invention will be hereinafter fully specified and claimed.

Moles inhabit old fields, gardens, and farms in general, and work great damage by burrowing just under the surface of the ground, and in many places do a great deal of damage. Salamanders not only destroy small produce, but take up a great deal of room. Large rats undermine houses, cribs, &c., and do an immense amount of damage. Prairie-dogs also burrow in and under the ground, and work considerable damage in some localities.

My new compound or composition will thoroughly and effectually exterminate these vermin, as well as ants, and it is composed of the following ingredients in substantially the proportions here given. These ingredients and their proportions are as follows: Bisulphide of carbon, one-half pint; pulverized sulphur, four large spoonfuls; a solution of saltpeter, one-fourth ounce, and water, one-fourth pint; a solution of cyanide of potassium, one-fourth ounce, and water, one-fourth pint; benzine, (if desired,) one-fourth pint; kerosene-oil, one-fourth pint; sulphuric ether, one-eighth pint; naphtha, one-eighth pint.

The above-named ingredients are taken in substantially the proportions above given, and are thoroughly mixed together before using, after which a sufficient quantity of the mixture is taken, (about a quarter of a pint for an ordinary sized ant-nest, and a larger quantity for a larger nest or for the dens of animals,) and is put in the bed or den and set on fire with a match and the fumes allowed to permeate the earth, or, better still, are forced through the earth or bed or den to be fumigated by means of a bellows, or a piece of iron can be placed over the entrance of the den, having a hole in it, which will force the fumes through the entire den. As a portion of the above ingredients are very inflammable, which will assist in burning the other ingredients that are not inflammable, but the fumes of which are very poisonous to animal and insect life, the compound burns readily but slowly, and creates a very dense and poisonous smoke, which is very effective in killing off the ants, prairie-dogs, salamanders, &c.

I have found by practical test and use that my new compound or composition, formed or composed of the several ingredients in substantially the proportions above given, will operate rapidly, thoroughly, and effectively in destroying and exterminating ants, moles, salamanders, prairie-dogs, large rats, and the like. It can be prepared at a comparatively small cost and will give the greatest satisfaction, as it will kill and permanently exterminate a greater number of ants or of either of the vermin above mentioned than any other preparation, as has been found by practical experiment and use.

Having thus described the several ingredients and stated their proportions, what I claim, and desire to secure by Letters Patent of the United States, is—

The herein-described insecticide, consisting of bisulphide of carbon, pulverized sulphur, solution of saltpeter, solution of cyanide of potassium, benzine or naphtha, kerosene oil, and sulphuric ether, mixed together in substantially the proportions specified.

In testimony that I claim the foregoing as my own I have hereunto affixed my signature in presence of two witnesses.

JAMES THOMAS SIMPSON.

Witnesses:
R. GILMORE,
C. A. MCKELROY.